United States Patent
McKay et al.

(10) Patent No.: US 9,336,490 B2
(45) Date of Patent: May 10, 2016

(54) COMBINATORICS METHOD FOR PROBABILISTIC GEOLOCATION

(71) Applicants: William Ryon McKay, Syracuse, NY (US); Jonathan David Adelman, Mexico, NY (US)

(72) Inventors: William Ryon McKay, Syracuse, NY (US); Jonathan David Adelman, Mexico, NY (US)

(73) Assignee: Syracuse University, Syracuse, NY (US)

( * ) Notice: Subject to any disclaimer, the term of this patent is extended or adjusted under 35 U.S.C. 154(b) by 281 days.

(21) Appl. No.: 13/829,556

(22) Filed: Mar. 14, 2013

(65) Prior Publication Data
US 2014/0279812 A1 Sep. 18, 2014

(51) Int. Cl.
*G06N 7/00* (2006.01)

(52) U.S. Cl.
CPC ...................... *G06N 7/005* (2013.01)

(58) Field of Classification Search
CPC .............................. G06N 99/005; G06N 7/005
USPC ............................................ 706/12; 708/231
See application file for complete search history.

(56) References Cited

U.S. PATENT DOCUMENTS

| 7,219,032 | B2 | 5/2007 | Spiesberger |
| 7,266,484 | B2 | 9/2007 | Lombardo |
| 7,912,627 | B2 | 3/2011 | Downs |
| 7,986,809 | B1 | 7/2011 | Funk |
| 7,992,113 | B1 | 8/2011 | Goldberg |
| 8,145,334 | B2 | 3/2012 | Do |
| 8,188,920 | B2 | 5/2012 | Thomson |
| 2010/0185388 | A1* | 7/2010 | Horvitz .................. 701/204 |
| 2012/0084249 | A1 | 4/2012 | Adelman |

OTHER PUBLICATIONS

Gogate et al. "Approximate Counting by Sampling the Backtrack-free Search Space". Proceedings of the 22nd national conference on Artificial intelligence [Online] 2007, vol. 1, pp. 198-203.
Phillips et al. "Accuracy of geolocation estimates for flying seabirds". Marine Ecology Progress Series [Online] 2004, vol. 266, pp. 265-272.

* cited by examiner

*Primary Examiner* — Stanley K Hill
*Assistant Examiner* — Ola Olude Afolabi
(74) *Attorney, Agent, or Firm* — Blaine T. Bettinger; George R. McGuire; Bond Schoeneck & King, PLLC

(57) ABSTRACT

A method and system for geolocation. The method and system determines the geographic history of a target of interest (i.e., the probability that a sample of interest passed though a defined location) given a combination of spatially attributable input data and weighing distributions, and modifying the probability for each possible location using the equation $$P(x) = \frac{\sum_k^K (w(k) \cdot n_x)}{\sum_k^K (w(k) \cdot n_t)},$$

where P(x) is the probability that the sample of interest passes through a given geographic location X, $n_t$ is the total number of possible legal travel routes for the sample of interest, $n_x$ is the number of legal travel routes including location X, k is the travel route's cardinality, and w(k) is the assigned weight for cardinality k from the user-defined weighting function.

9 Claims, 6 Drawing Sheets

An unknown number of balls are selected from an unknown number of urns, what is the probability an urn was selected from given that this is the set of colors selected?

bigleaf maple singleleaf pine northwestern mannagrass canyon live oak

COMBINATORICS METHOD FOR PROBABILISTIC GEOLOCATION

BACKGROUND OF THE INVENTION

1. Field of the Invention

The present invention relates to methods and systems for geolocation, and more particularly, to a method and system for determining the geographic history of a target of interest (i.e., the probability that a sample of interest passed though a defined location) given a combination of spatially attributable input data and weighing distributions.

2. Description of the Related Art

In an increasingly interconnected world, there is a need to quickly and efficiently track the geographic origin or travel history of an item. Forensic palynology, for example, is the study of pollen to determine the geographic location an item might have originated from or traveled through, as well as when it might have done so. Forensic palynology is often used by law enforcement to gather evidence about certain types of crimes.

Forensic palynology is one of many methods of geolocation that can be used for numerous applications including: (i) determining the travel history of a person or item; (ii) determining the point of origin of a person or item; and (iii) estimating the approximate date or time of year that an object was in a geographic location, among others.

Prior pollen-based geolocation methods have relied on human expertise, an approach that is qualitative rather than quantitative in nature, or on simulation-based approaches (e.g. Monte Carlo simulation) to empirically geolocate. Further, prior pollen-based geolocation methods are by their nature limited to pollen-specific data, and geolocation methods used on other spatial data types are typically limited to performing analyses on that data type.

SUMMARY OF THE INVENTION

It is therefore a principal object and advantage of the present invention to provide a method and a system for determining the geographic history of a target of interest (i.e., the probability that a sample of interest passed though a defined location) given a combination of spatially attributable input data and weighing distributions.

It is a further object and advantage of the present invention to provide a probabilistic geolocation method and system that is distinguishable from other geolocation methods by (1) accepting any spatially attributed information as opposed to only type-specific data such as plant species identifications, stable isotope ratios, etc., and (2) directly (not empirically) calculating the probability that a sample of interest passed through a certain location given evidentiary data. Stated differently, an embodiment of the present invention departs from previous efforts by directly calculating probabilities instead of using subjective human expertise or indirectly acquiring approximations by means of Monte Carlo simulation or other empirical approaches, and is also generalized to be data agnostic; as long as input data are spatially attributed (e.g., plant species identifications via pollen morphology or molecular approaches, stable isotope data, chemical signatures, and/or other spatially attributed data), they can be used to inform a geolocation system's outputs. If the input data are plant species identifications based on DNA acquired from a targeted sample of interest, for example, it would be preferable to have the spatial ranges (even if these data are flawed) of the plant species that were detected; if the input data are stable isotopic signatures, it would be preferable to know fractionation rates (even if flawed or imprecise) at different points around the world. In any instance where an embodiment of the invention is used, it is preferable to have detected a target of interest but also preferable to have information on where spatially associated data detected on the target of interest is found.

It is a further object and advantage of the present invention to provide a probabilistic geolocation method and system that can be repeatable, mathematically robust, and scalable to any geographic region for which spatial variation in input data is observed between locations.

Other objects and advantages of the present invention will in part be obvious, and in part appear hereinafter.

In accordance with the foregoing objects and advantages, the present invention provides a probabilistic geolocation method, the method comprising: (a) acquiring spatially associated data from an obtained sample of interest; (b) enumerating all possible travel routes the sample of interest may have passed through based on the spatially associated data; (c) determining the frequency with which each possible geographic location appears in those travel routes; (d) weighing the resulting frequencies to account for the analyst's/user's assumptions; (e) outputting a probability for each possible location based on the above steps; and (f) applying the following modification to the probability for each possible location:

$$P(x) = \frac{\sum_k^K (w(k) \cdot n_x)}{\sum_k^K (w(k) \cdot n_t)}$$

where $P(x)$ is the probability that the sample of interest passes through a given geographic location X, $n_t$ is the total number of possible legal travel routes for the sample of interest, $n_x$ is the number of legal travel routes including location X, k is the travel route's cardinality, and $w(k)$ is the assigned weight for cardinality k from the user-defined weighting function. The resulting probabilities are conditional upon the travel routes being "legal" (i.e., the combination of locations in a given travel route must account for all spatially attributable data observations), and whatever assumptions the analyst/user has made. Any assumption can be reflected in the form of a probability weighting function that modifies the locations' probabilities accordingly. With respect to the concept of "legal" as it pertains to travel routes of a sample of interest, plant species A (a tree species) is used in the following example to further illustrate this concept. A "legal" travel route is one in which all observed plant species can be found on at least one location within that route. For example, if DNA is detected from plant species A that only grows in New York state, New York State must be part of any legal travel route. If the plant species A is found in either New York or New Jersey, then all travel routes must contain at least one of New York/New Jersey.

A further embodiment of the present invention provides a probabilistic geolocation method, wherein the step of (b) enumerating all possible travel routes of a sample of interest further comprises (e) treating an incidence matrix of species and locations as a hypergraph with locations as vertices and species as edges, and (f) utilizing the resulting minimal transversals of the hypergraph as seeds that all legal routes must contain.

Yet another embodiment of the present invention is a probabilistic geolocation method, wherein the step of (b) enumerating all possible travel routes of a sample of interest further comprises (g) utilizing Boolean satisfiability (SAT) problem in conjunctive normal form to model species and location information, and (h) subsequently determining all legal routes.

BRIEF DESCRIPTION OF THE DRAWINGS

The present invention will be more fully understood and appreciated by reading the following Detailed Description of the Invention in conjunction with the accompanying drawings, in which.

DETAILED DESCRIPTION OF THE INVENTION

Figure 1:
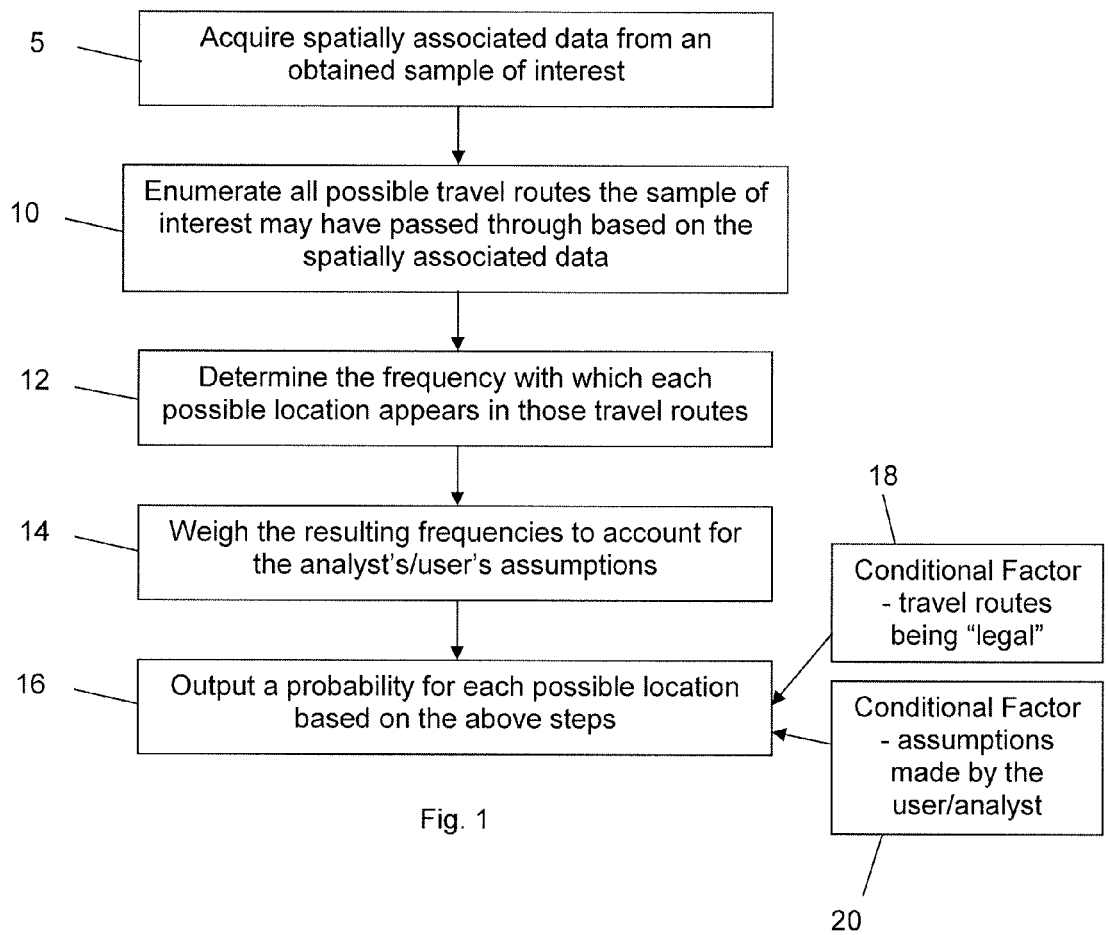
FIG. 1 is a schematic representation of an embodiment of the method according to the present invention.

Referring now to the drawings wherein like reference numerals designate identical or corresponding parts throughout the several views, there is shown in FIG. 1 a schematic representation of a probabilistic geolocation method, and thus steps performed by a probabilistic geolocation system, according to an embodiment of the present invention.

As shown in FIG. 1, as an initial step 5, spatially associated data are acquired from an obtained sample of interest. In step 10, all possible travel routes that a sample of interest may have passed through based on the spatially associated data are enumerated. In step 12, the frequency with which each possible location appears in those travel routes are determined. In step 14, the resulting frequencies to account for the analyst's/user's assumptions are weighed. In step 16, a probability for each possible location based on the above steps is outputted. The resulting probabilities can be conditional upon following two factors: (1) the travel routes being "legal" (i.e., the combination of locations in a given travel route must account for all spatially associated data observations), and (2) whatever assumptions the analyst has made. These conditions can be fed into step 16 at steps 18 and 20, respectively. Any assumption can be reflected in the form of one or more probability weighting functions (pwf) that modifies the locations' probabilities accordingly.

Advantages of the invention are illustrated by the following Examples. However, the particular materials and amounts thereof recited in these examples, as well as other conditions and details, are to be interpreted to apply broadly in the art and should not be construed to unduly restrict or limit the invention in any way.

It has been found that the sheer number of possible travel routes to be enumerated can often be staggering due to factorial growth. Two approaches to enumerate all possible "valid" travel routes are set forth below. The first approach relates to utilizing minimal transversals, and the second approach relies on a #SAT solver.

Example 1

Using Minimal Transversals

Figure 2:
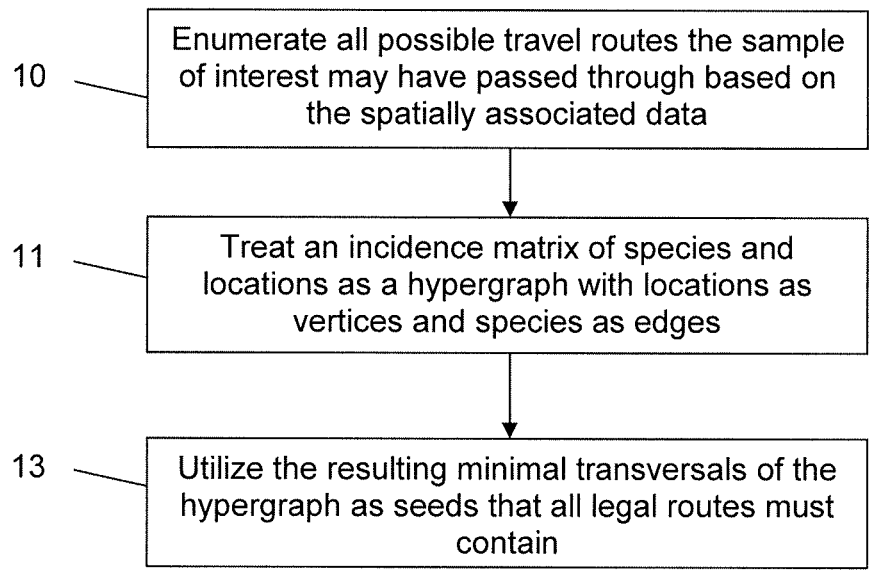
FIG. 2 is a schematic representation of an embodiment of the method according to the present invention.

This Example describes wherein step 10, enumerating all possible travel routes of a sample of interest, further comprises step 11—treating an incidence matrix of spatially associated data (such as plant species) and locations as a hypergraph with locations as vertices and spatially associated data as edges, and step 13—utilizing the resulting minimal transversals of the hypergraph as seeds that all legal routes must contain (see FIG. 2).

Let the probability P(x) that the sample passes through a given location x be expressed using the following equation:

$$P(x) \approx \frac{n_x}{n_t} \quad (1)$$

where $n_t$ is the total number of possible legal travel routes for the sample and $n_x$ is the number of legal travel routes including location X.

Finding the denominator of Equation 1 is the most technically challenging aspect of this approach, and centers around the calculation of minimal transversals. Consider an incidence matrix, I, where rows represent spatially associated data such as plant species detections, columns represent associated locations, and matrix elements are either 1 (present) or 0 (absent) for each species-location intersection. These presence-absence data are used to calculate the above-mentioned probabilities for each location in I, as this simple example demonstrates as shown in Table 1 below:

TABLE 1

|  | A | B | C | D |
|---|---|---|---|---|
| Species 1 | 1 | 1 | 1 | 0 |
| Species 2 | 1 | 0 | 1 | 0 |
| Species 3 | 0 | 0 | 0 | 1 |

Finding $n_t$ is done by enumerating all legal combinations of locations that could represent viable travel routes:
A, B, D
A, B, C, D
A, C, D
A, D
B, C, D
C, D Probabilities could then be calculated; for example, $n_t$ is 6 and $n_x$ for Location A is 4, meaning P(A) is two-thirds. However, a brute force approach in which each possible "legal" combination of locations is enumerated is computationally intractable for incidence matrices with a large number of species and locations.

A solution is to treat I as a hypergraph with locations as vertices and species as edges (step 11), and to utilize the resulting minimal transversals of the hypergraph as seeds that all legal travel routes must contain (step 13). For example, consider the above incidence matrix; there are two minimal transversals: (A, D) and (C, D). Every other possible travel route contains, at very least, one of these two seeds.

One can determine the number of travel routes by utilizing the minimal transversals. Consider an m×n baseline matrix B where rows represent cardinality from 1 through the total number of locations on the incidence matrix, columns represent each minimal transversal (sorted by cardinality), and matrix elements are the number of possible travel routes of cardinality m that include the locations found in minimal transversal n. B is populated using the cardinality of each minimal transversal and subsequently applying binomial expansion. For each minimal transversal of cardinality k, all matrix elements where cardinality is less than k are set to 0. All matrix elements where cardinality equals k are set to 1. All matrix elements where cardinality is one greater than k are set to (k−1). Each minimal transversal's column should be populated equivalently to the mth row of Pascal's Triangle, where m is the total number of locations from I. This matrix contains duplicates that must be removed; to use the above example, the travel route (A, C, D) can be created using either of the two seed minimal transversals. After duplicate removal, a summation of all the elements in the modified matrix B produces the denominator of Equation 1.

Finding $n_x$ is also necessary in order to calculate a probability for a given location. This latter parameter is acquired by repeating the enumeration described above while removing one column (location) from the incidence matrix. The rationale is based on the following equation:

$$n_x = n_t - n_{!x} \tag{2}$$

where $n_x$ is the number of travel routes containing the location X, and $n_{!x}$ is the number of travel routes that do not contain that location. By removing the column for a given location from the incidence matrix, one can calculate $n_{!x}$ and thereby determine $n_x$. Dividing $n_x$ into $n_t$ will yield the probability for that location, as per Equation 1. Thus, the equation and steps needed to determine the numerator for equation 1 have been provided, thereby providing information helpful for Step 12.

Example 2

Using a #SAT Solver

Figure 3:
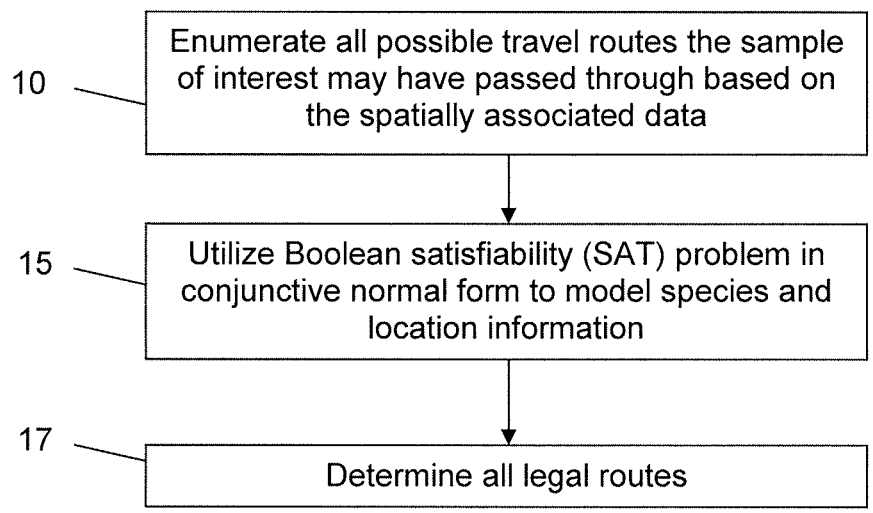
FIG. 3 is a schematic representation of an embodiment of the method according to the present invention.

This Example describes wherein step 10, enumerating all possible travel routes of a sample of interest, further comprises step 15—utilizing Boolean satisfiability (SAT) problem in conjunctive normal form to model species and location information, and step 17—subsequently determining all legal routes (see FIG. 3).

Determining legal travel histories can also be recast as a computer science Boolean satisfiability (SAT—pronounced 'sat') problem. The SAT problem in conjunctive normal form (CNF) is used to model the species and location information (step 15); each clause is a species and each variable in the clause is a state. In the Boolean formula below the first clause is for Species 1.

$$(A \vee B \vee C) \wedge (A \vee B) \wedge (D)$$

To satisfy this formula Boolean values are set for each location, either true or false. The formula is then evaluated and if it evaluates to true then it is a legal travel history. In this formula setting D and A to true makes the whole formula true, and is one of the possible solutions to this SAT problem. The set of all solutions to the SAT problem is the set of possible travel routes. The specific computer science problem to enumerate all possible assignments to a SAT problem is #SAT (pronounced 'sharp sat'). A #SAT solver will enumerate all possible travel routes (step 17). However, due to the factorial growth of all the possible travel routes it is computationally expensive to explicitly enumerate them all. The minimum transversal method alleviates the need to enumerate all routes explicitly.

Example 3

Weighing Functions

This Example discusses the application of probability weighing functions to the probabilities obtained thus far in the previous Examples. The probabilities obtained thus far are all based on the condition that all possible travel routes are equally likely. This is often incorrect in real-world scenarios. For example, the National Household Travel Survey is conducted by the United States each year, and results have consistently shown that frequency of occurrence decreases exponentially as travel length increases. One can assume that a uniform distribution is applied to the probabilities calculated above, or one can purposefully apply other probability weighting functions such as an exponential decay function implied by the NHTS data. In either case one utilizes Equation 3 (where $w_k$ is the weighting function, $n_t$ is the total number of possible legal travel routes for the sample, $n_x$ is the number of legal travel routes including location X, and summation occurs from the smallest observed travel route (cardinality=k) to the largest observed travel route (cardinality=K)) and decides which distribution to use for the weighting function $w_k$. A probability weighting function more reflective of the NHTS data might be the one shown in Equation 4, where k is the cardinality of the travel route (i.e. the number of locations in the route).

$$P(x) = \frac{\sum_k^K (w(k) \cdot n_x)}{\sum_k^K (w(k) \cdot n_t)} \tag{3}$$

$$w_k = 2^{-k} \tag{4}$$

Thus, in step 14, the resulting frequencies obtained in Step 12 can be weighed using one or more weighting functions to account for the analyst's/user's assumptions.

Example 4

Balls-and-Urns Scenario

Figure 4:
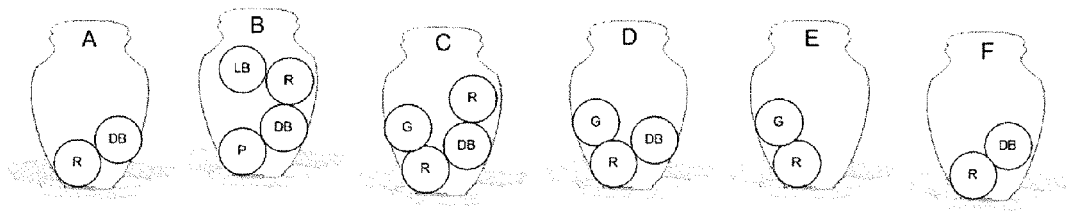
FIG. 4 is a schematic representation of a complex probability problems recast as simplified balls-and-urns according to an embodiment of the present invention.
Figure 4:

This Example discusses a simplified ball-and-urn scenario. A common practice among mathematicians is to recast complex probability problems as simplified balls-and-urns scenarios, in which colored balls are placed in urns and some probability P is sought by selecting balls from the urns. In this particular problem, one is given a set of colors corresponding to selected balls; the goal is to assign for each urn—the probability that at least one of these balls was taken from the urn. What appears to be a simple problem is complicated by the unknowns: we do not know the number of balls of each color in an urn, only the colors associated with that urn (see FIG. 4, where "R"=Red, "P"=Purple, "G"=Green, "LB"=Light Blue, and "DB"=Dark Blue). In the above problem, one ball per color is used in each urn to represent the fact that that color is present, in an unknown quantity. We also do not know the total number of balls selected. Based only on the set of selected colors, how can probabilities be assigned to the urns?

Part of the solution to the problem is to determine 'legal' sets of urns that contain the colors of balls selected. This will give one of the possible set of urns that might have been selected from. For example, in the above problem any such legal set of urns must contain C, D, or E to account for the green ball. The urn D by itself is a legal urn set because it contains all the selected colors. The computer science model that can be used to analyze this problem, as discussed above, is Boolean satisfiability (SAT—pronounced 'sat'). The SAT problem in conjunctive normal form (CNF) is used as the model; each clause is a colored ball (the first parenthetical is "Red"; the second parenthetical is "Green"; and the third parenthetical is "Light Blue") and each variable in the clause is an urn as shown below.

$$(A \lor B \lor C \lor D \lor E \lor F) \land (C \lor D \lor E) \land (A \lor B \lor C \lor D \lor F)$$

To satisfy this formula Boolean values for A through F must be chosen to allow the whole formula to evaluate to true. In this example setting either C or D true makes the whole formula true, and are two of the many possible solutions to this SAT problem.

Every solution to the SAT problem is a possible set of urns that might have been selected from. The solution to assigning a probability to each urn is to enumerate all possible solutions to the SAT problem and use the frequency of each urn in the solutions as the probability. The probabilities are calculated as follows.

$$P_{Solutions}(urn_i) = \frac{\text{count of } urn_i \text{ in solutions}}{\text{count of all solutions}}$$

The specific computer science problem to enumerate all possible assignments to a SAT problem is #SAT. A #SAT solver will create the list of possible urns that account for the colors of the selected balls. As shown below, there are 55 possible solutions to the example posed in the problem.

Solution 1: C E F
Solution 2: C D E F
Solution 3: C D E
Solution 4: C E
Solution 5: B C D E F
Solution 6: B C E F
Solution 7: B C E
Solution 8: B C D E
Solution 9: A B C D E F
Solution 10: A B C E F
Solution 11: A C E F
Solution 12: A C D E F
Solution 13: A B C E
Solution 14: A B C D E
Solution 15: A C D E
Solution 16: A C E
Solution 17: A E F
Solution 18: A D E F
Solution 19: A B E F
Solution 20: A B D E F
Solution 21: A E
Solution 22: A D E
Solution 23: A B D E
Solution 24: A B E
Solution 25: B D E
Solution 26: D E
Solution 27: B E
Solution 28: B E F
Solution 29: B D E F
Solution 30: D E F
Solution 31: E F
Solution 32: A B C D
Solution 33: B C D
Solution 34: A B C
Solution 35: B C
Solution 36: A B C D I
Solution 37: A B C F Solution 38: B C D F
Solution 39: B C F
Solution 40: A C F
Solution 41: A C
Solution 42: C
Solution 43: C F
Solution 44: A C D F
Solution 45: C D F
Solution 46: C D
Solution 47: A C D
Solution 48: B D
Solution 49: D
Solution 50: A D
Solution 51: A B D
Solution 52: B D F
Solution 53: A B D F
Solution 54: D F
Solution 55: A D F Collecting all the urn counts results in the following probabilities set forth in Table 2, which completes Step 12.

TABLE 2

| Urn | Probability urn is part of a solution |
| --- | --- |
| A | .5091 |
| B | .5091 |
| C | .5818 |
| D | .5818 |
| E | .5636 |
| F | .5091 |

As noted above, an embodiment of the present invention may be used to determine the probability that a sample of interest passed through a defined location, given a combination of spatially attributable input data (e.g. DNA associated with a plant species that has a given geographic range) and weighting distributions. A hypothetical example is included below.

Example 5

Illicit Good Shipment

Figure 5:
FIG. 5 is a schematic representation of the spatial distributions of the following four plant species: *Acer macrophyllum* (bigleaf maple), *Glyceria occidentalis* (northwestern mannagrass), *Pinus monophylla* (singleleaf pinyon), and *Quercus chrysolepis* (canyon live oak), according to an embodiment of the present invention.
Figure 5:
Figure 5:
Figure 5:

A shipment of illicit goods housed in a sealed crate is intercepted by USCBP agents at an unnamed port. The crate is opened and a sample of plant residues is acquired from its interior. The sample's associated plant species are shown in FIG. 5. Given no information about how many U.S. states the biological sample passed through, what is the probability that the sample passed through a specific state S?

There are eight total U.S. states within which at least one of the four detected species is found. An embodiment of the method of probabilistic geolocation of the present invention along with the probabilistic weighting function proceeds as follows. An incidence matrix is constructed with the following columns: California, Oregon, Washington, Idaho, Nevada, Utah, Arizona, and New Mexico; and with the following rows: bigleaf maple, singleleaf pine, northwestern mannagrass, and canyon live oak. Equation 2 is used to determine nx for each location. Equation 4 is used to define the probability weighting function. Equation 3 is then used to produce the following probabilities: P(CA)=0.5286, P(OR)=0.4822, P(WA)=0.4358, P(NV)=0.372, P(AZ)=0.372, P(NM)=0.372, P(ID)=0.3488, and P(UT)=0.3488.

In accordance with an embodiment of the present invention, a general system is provided which can perform one or more steps of the embodiments of the methods of the embodiments of the present invention described herein.

In accordance with an embodiment of the present invention, a general system can have the following inputs: (1) one or more identified spatially associated data types detected on a sample of interest; (2) existing spatial data for the detections, detailing geographic locations where they may be found. A system of an embodiment of the present invention performs the methods described herein and takes these data (detections, locations of those detections) and outputs probabilities. Each probability corresponds to a possible location in the spatial domain that the sample of interest passed through; each is the probability that the sample passed through the associated location. One embodiment of the system, for example, might be provided plant species detected from analysis of DNA found on clothing of a detained person of interest. That embodiment would also be provided with range data for all detected plant species for which DNA was found on the person of interest. The system would then calculate the probability, for each location for which one or more of the plant species are found, that the person of interest passed through said location. Because these calculations can be computationally intensive, it is possible that such a system will require the use of a computer/processor, with the methods described herein represented in a program that takes the system's input data, performs the methods described herein, and outputs probabilities for each possible location. It should be noted that a system need not require plant species data; the input data can be of any type so long as it is spatial data (that is, so long as the inputs have attributed geographic ranges).

Figure 6:
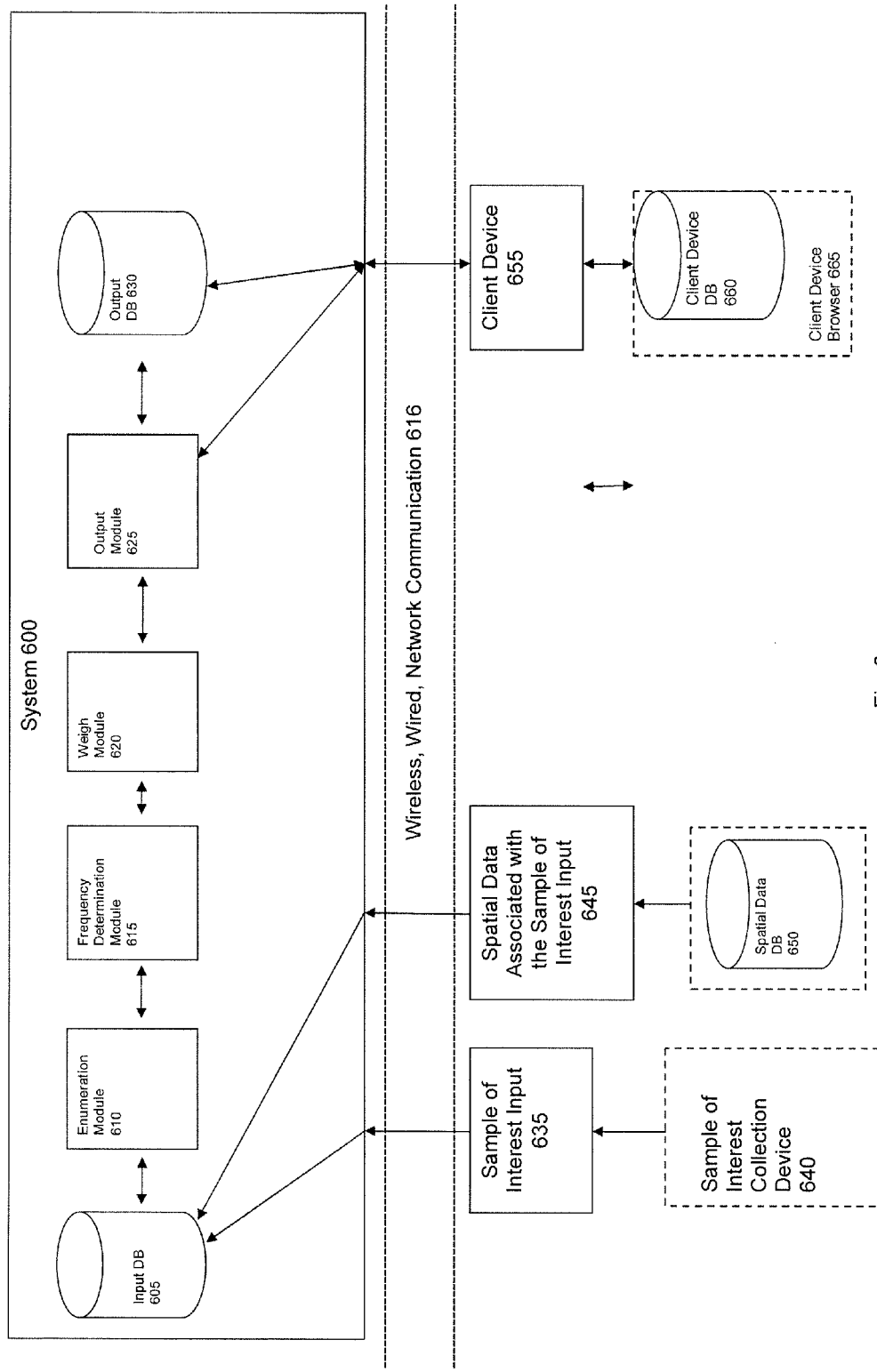
FIG. 6 is a schematic representation of an embodiment of a probabilistic geolocation system according to the present invention.

As shown in FIG. 6, a schematic representation of an embodiment of a probabilistic geolocation system according to the present invention is provided. In particular, FIG. 6 shows a system architecture diagram of a system for determining the geographic history of a target of interest (i.e., the probability that a sample of interest passed though a defined location) given a combination of spatially attributable input data and weighing distributions with various communication links, according to one embodiment of the present invention. A sample of interest input 635 (which can be connected to a sample of interest collection device 640) and spatial data associated with the sample of interest 645 (which can be connected to a spatial data database that contains information including spatial data for a detected species in the sample of interest, detailing geographic locations where the species may be found) can be communicated to the system 600 over a network 616. Further, a client device 655 (which can be attached to a client device database 660) can communicate with the system 600, and vice versa, over the network 616. Network 616 can be a wired connection, or any suitable wired or wireless network capable of transmitting communication, including but not limited to a telephone network, Internet, Intranet, local area network, Ethernet, online communication, offline communications, wireless communications and/or similar communications means. The network 115 can comprise one or more servers (not shown) to facilitate the communication. The server can be any processor, server, mainframe computer, or other processor-based device capable of facilitating communication.

Client device 655 is preferably any device capable of running, mirroring, displaying, or otherwise interacting with software modules in the system 600 (as is further described below). Examples of client devices include personal computers, desktops, laptops, tablets, personal digital assistants, mobile phones, mobile computers, net books, smart phones, pocket computers, handheld computers, pagers, or a mixture thereof, as well as any other fixed or mobile computerized device comprising a processor and a network connection and capable of communicating with the system 600 via network 616. Client device 655 can also comprise external or internal input or output devices such as a mouse, DVD player, CD-ROM, keyboard, and monitor, among others. The client device, therefore, is any processor-based device connected to network 616 that is capable of facilitating the user's access and interaction with the system 600. The software system shown in system 600 can also be installed and run locally on a client device 600. Even though one client device is shown connected to system 600, it is contemplated that a plurality of client devices may connect to system 600.

The client device 655 can include (along with a network connection) a software or program component such as a web browser 665 to interface with the system 600. Browser 665 can comprise a user interface that can be designed to enable client device 655 to access, retrieve, and view resources and documents, including resources and documents found on the Internet or an Intranet, and locally-stored files, among other sources. For example, the browser can be designed for viewing an Intranet within an organization, or any other connection of local computers. Although database 660 are shown in the embodiment in FIG. 6 as being associated with browser 665, respectively, and therefore with client device 655, respectively, there is no requirement for this particular configuration. Database 660 can be located locally or remotely, and can be in wired or wireless communication.

In a preferred embodiment, client device 655 includes a processor coupled to a non-transitory computer-readable medium, such as random access memory (RAM). The non-transitory computer-readable medium can include, but is not limited to, an electronic, optical, magnetic, or other storage or transmission device, such as a floppy disk, CD-ROM, DVD, magnetic disk, memory chip, ROM, or RAM, which is capable of providing a processor with computer-executable program instructions. The client device processor comprises or is in communication with the non-transitory computer-readable medium on which is stored computer-executable program instructions that are executed by the processor to cause the processor to perform one or more of the steps described herein (in conjunction with any software engines, such as the animation engine discussed below). The computer-executable program instructions can comprise any computer-programming language known in the art. In an alternative embodiment, a processor that works with a particular client device can be located remotely instead of locally, and can be in wired or wireless communication.

System 600 can further include an input database 605, an enumeration module 610, a frequency determination module, a weigh module 620, an output module 625, and an output database. A module can include, among other things, the identification of specific functionality represented by specific computer software code of a software program. A software program may contain code representing one or more modules, and the code representing a particular module can be represented by consecutive or non-consecutive lines of code.

The input database 605 can contain information regarding the input received from the sample of interest input (e.g., identification of the sample of interest including, for example, plant species detections) 635 and the spatial data associated with the sample of interest input 645, as described herein. The output database 605 can contain information regarding the output received from the output module.

The enumeration module 610 is structured, connected, and/or programmed to perform any and all steps associated with the step of enumerating all possible travel routes of a sample of interest described herein with respect to embodiments of the probabilistic geolocation method.

The frequency determination module 615 is structured, connected, and/or programmed to perform any and all steps associated with the step of determining the frequency with which each possible location appears in those travel routes described herein with respect to embodiments of the probabilistic geolocation method.

The weigh module 620 is structured, connected, and/or programmed to perform any and all steps associated with the step of weighing the resulting frequencies to account for the analyst's/user's assumptions described herein with respect to embodiments of the probabilistic geolocation method.

The output module 625 is structured, connected, and/or programmed to perform any and all steps associated with the step of outputting a probability for each possible location based on the above steps described herein with respect to embodiments of the probabilistic geolocation method.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the present invention has been described in connection with a preferred embodiment, it should be understood that modifications, alterations, and additions can be made to the invention without departing from the scope of the invention as defined by the claims.

What is claimed is:

1. A probabilistic geolocation method, the method comprising:
    acquiring spatially associated data from an obtained sample of interest;
    enumerating all possible travel routes the sample of interest may have passed through based on the spatially associated data;
    inputting said enumerated possible travel routes into a computer processor;
    determining, by said processor, the frequency with which each possible geographic location appears in the travel routes; and
    outputting, by said processor, a probability for said each possible geographic location, wherein the outputted probability is conditional upon all travel routes being legal; and
    applying the following modification to the probability for each possible location:

$$P(x) = \frac{\sum_{k}^{K} (w(k) \cdot n_x)}{\sum_{k}^{K} (w(k) \cdot n_t)}$$

where P(x) is the probability that the sample of interest passes through a given geographic location X, $n_t$ is the total number of possible legal travel routes for the sample of interest, $n_x$ is the number of legal travel routes including location X, k is the travel route's cardinality, and w(k) is the assigned weight for cardinality k from the user-defined weighting function.

2. The method of claim 1, further comprising the step of weighing the determined frequencies to account for a user's assumptions.

3. The method of claim 1, wherein the step of enumerating further comprises the step of calculating, by said processor, at least one minimal transversal for said sample of interest by treating an incidence matrix of the sample of interest and geographic locations as a hypergraph with the geographic locations as vertices and the spatially associated data detected on the sample of interest as an edge.

4. The method of claim 3, wherein the probability P(x) that the sample of interest passes through a given geographic location X is expressed using the following equation:

$$P(x) \approx \frac{n_x}{n_t}$$

where $n_t$ is the total number of possible legal travel routes for the sample of interest and $n_x$ is the number of legal travel routes including location X.

5. The method of claim 4, wherein the step of enumerating further comprises the step of utilizing, by said processor, the resulting at least one minimal transversal of the hypergraph as a seed that all legal routes must contain.

6. The method of claim 1, wherein the step of enumerating further comprises the step of utilizing, by said processor, Boolean satisfiability (SAT) problem in conjunctive normal form to model the sample of interest and geographic location information.

7. The method of claim 6, wherein the step of enumerating further comprises enumerating all possible travel routes by a #SAT solver.

8. The method of claim 1, further comprising the step of identifying said sample of interest, and inputting said identification of said sample of interest into said processor.

9. The method of claim 1, wherein said sample of interest contains spatially associated data selected from the group consisting of a first plant species identification gained from DNA taken from the sample of interest, a first species or genus identification via pollen grain morphology of pollen found on the sample of interest, and a first stable isotope detected on the sample of interest.

* * * * *